Patented Oct. 14, 1947

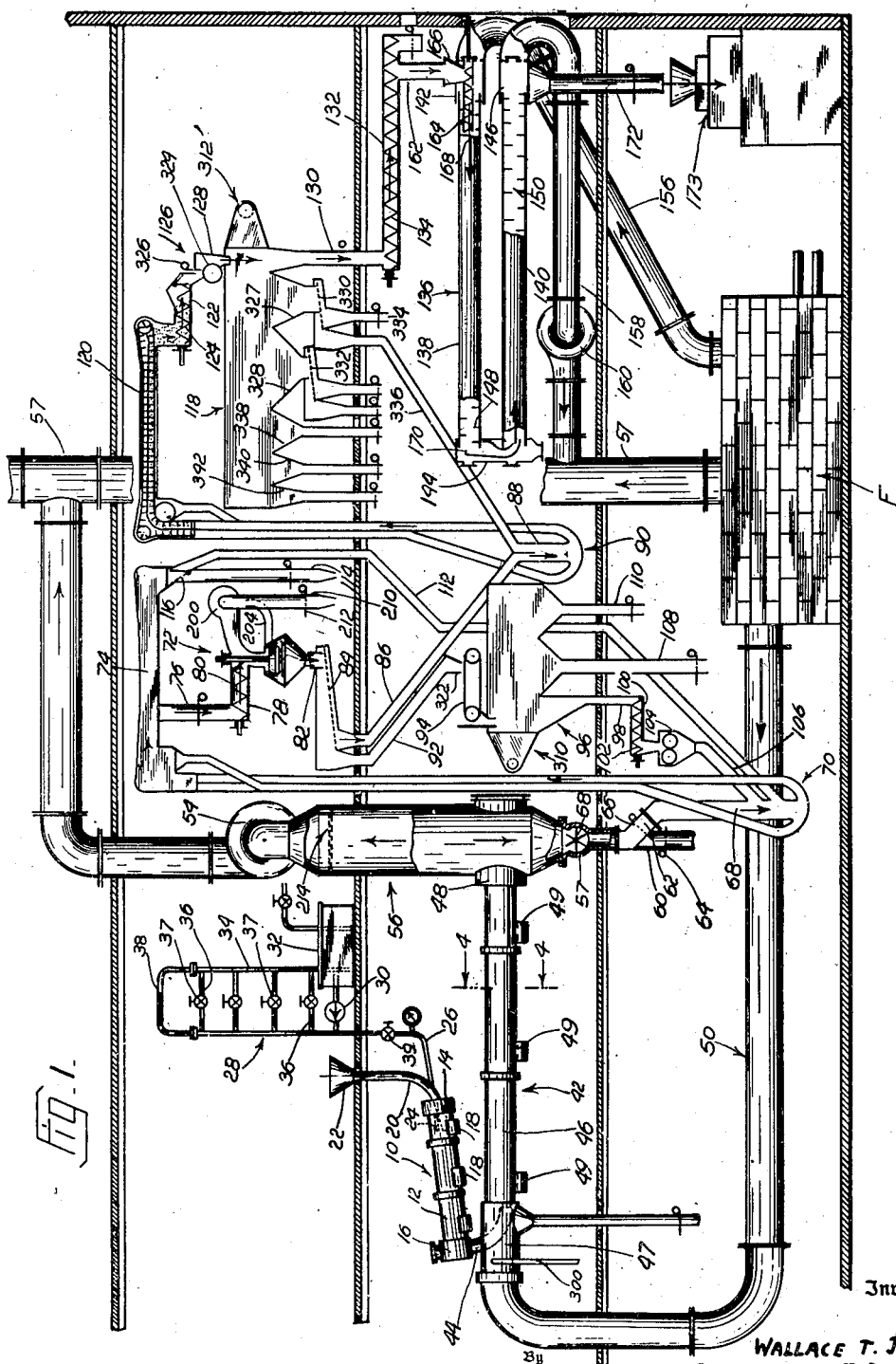

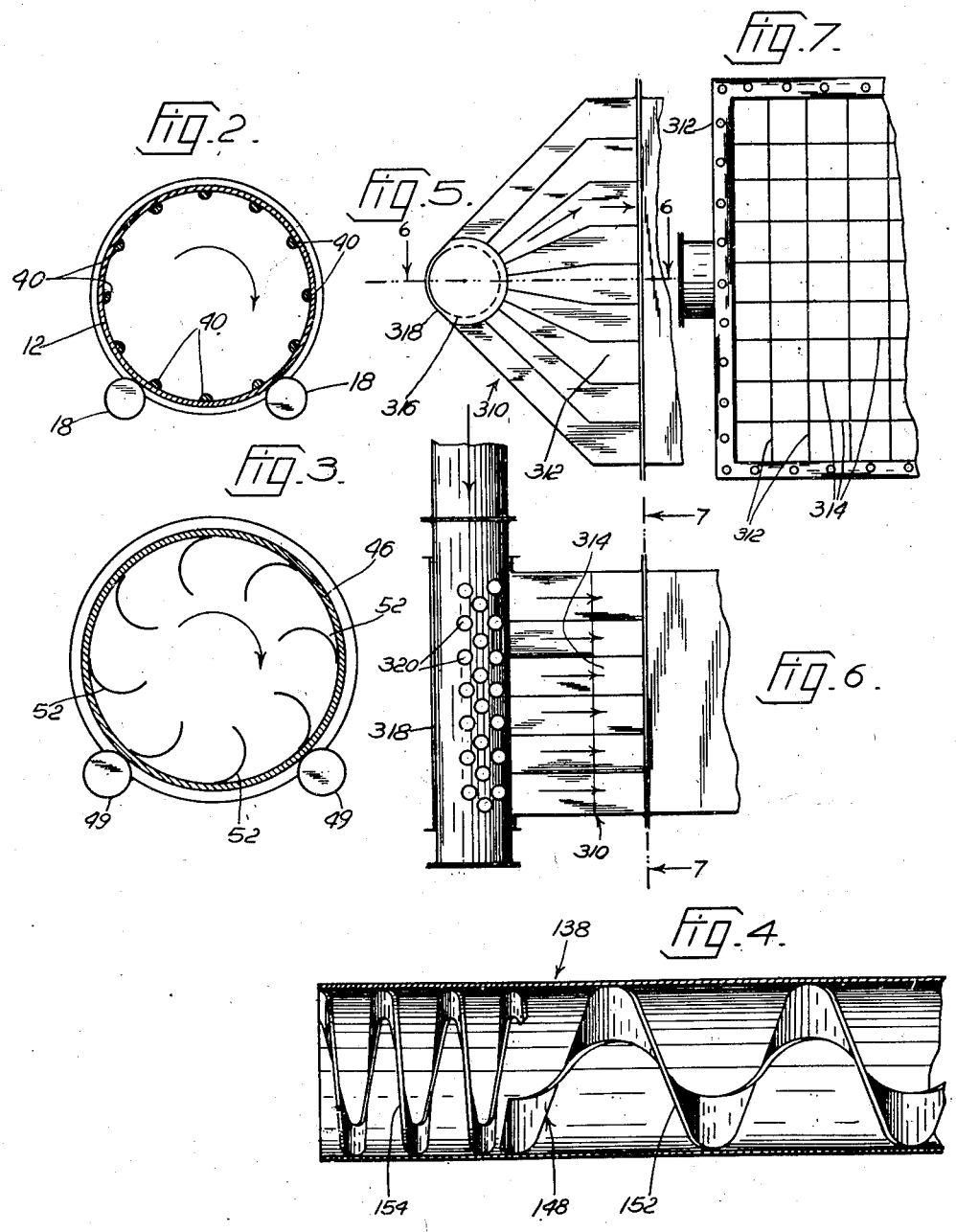

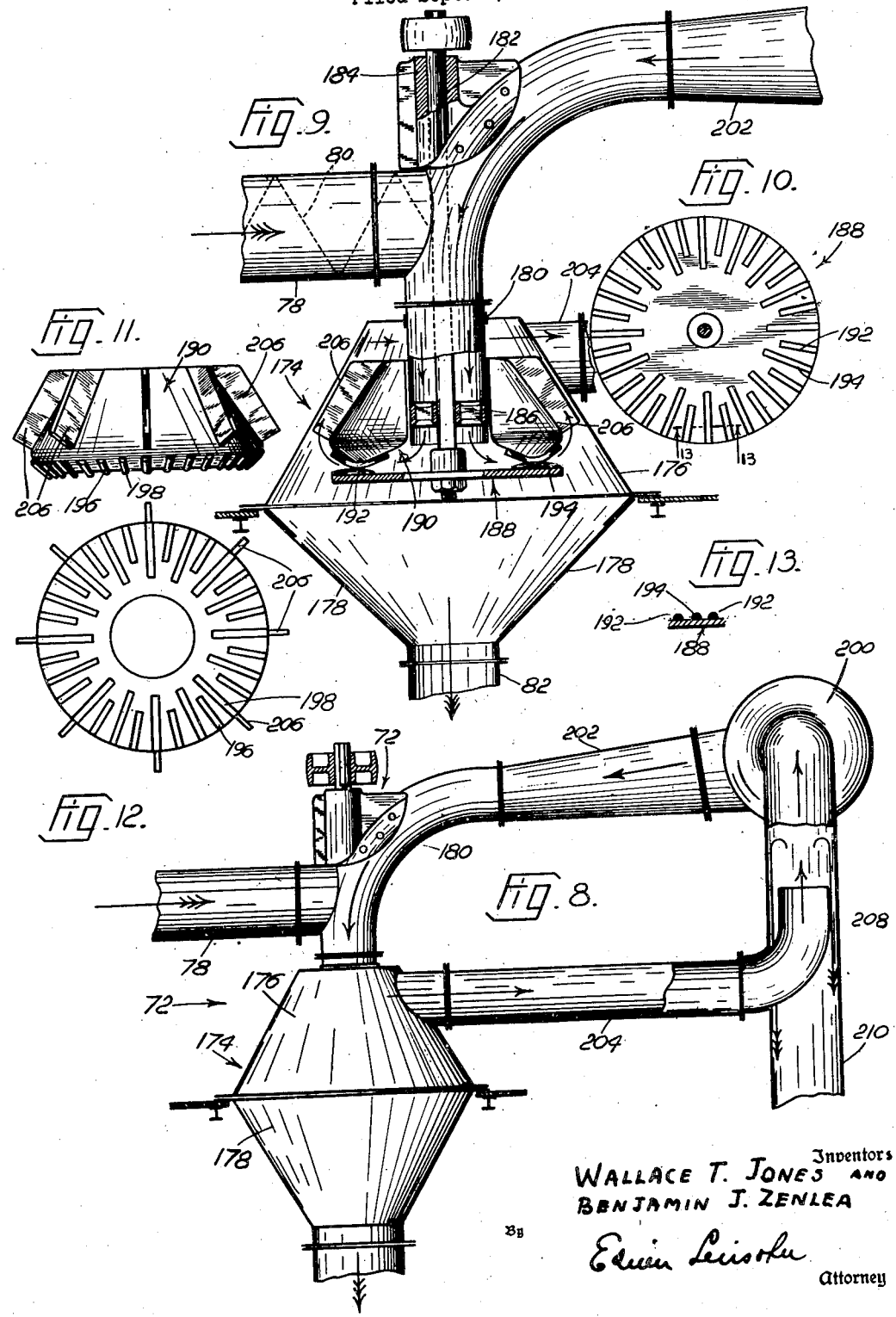

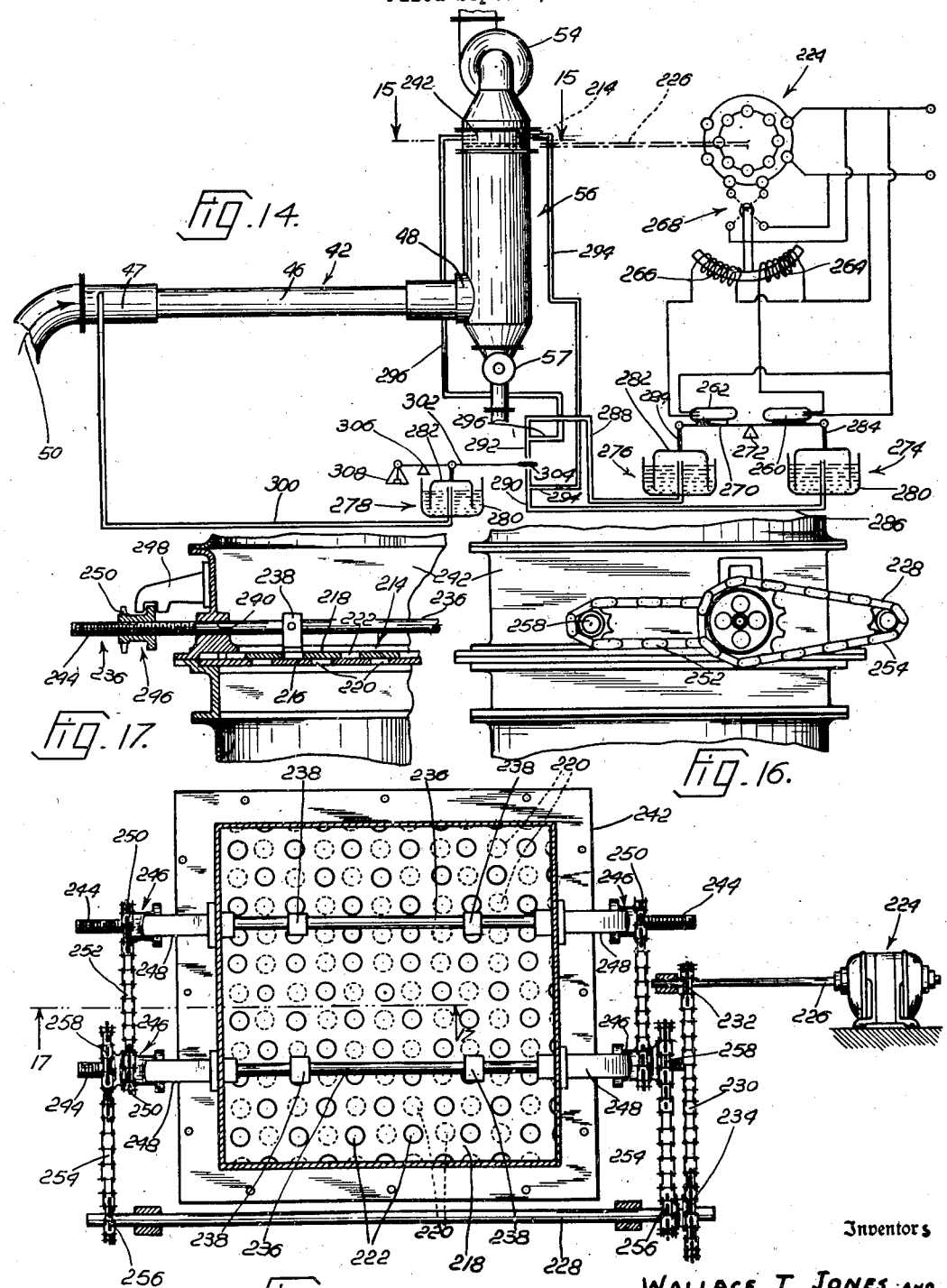

2,428,802

UNITED STATES PATENT OFFICE 2,428,802

PROCESS OF TREATING COCOA BEANS

Wallace T. Jones, New York, and Benjamin J. Zenlea, Ozone Park, N. Y., assignors to Rockwood & Co., Brooklyn, N. Y., a corporation of Delaware Application September 1, 1943, Serial No. 500,822

9 Claims. (Cl. 99—23)

This invention relates to a process of and apparatus for treating cocoa beans.

One object of the invention is the provision of a process for treating cocoa beans in such manner as to obtain roasted kernels or nibs of improved quality.

Another object of the invention is the provision of a process of roasting cocoa beans and removing the shells from the kernels or nibs of the beans in such manner as to substantially reduce loss of the butter fat content of the beans and to eliminate or greatly minimize the loss of parts of the kernels or nibs which are separated from the shells during the process.

A further object of the invention is to provide an improved method of conditioning the beans to facilitate the removal of the shells therefrom.

A further object of the invention is the provision of a continuous process which is well adapted to accomplish the above mentioned objects of the invention.

A further object of the invention is generally to provide an improved process of treating cocoa beans in a commercially practical and efficient manner for roasting the beans and for obtaining roasted cocoa beans of improved quality.

In accordance with the present invention, the raw cocoa beans are moistened with water and then subjected to intense heat. As a result of this treatment, the shells of the beans expand and are puffed away from the kernels of the beans and therefore can be more easily separated from the kernels or nibs while at the same time, the loss of butter fat is reduced and the quality of the roasted nibs is greatly improved. Also, due to this treatment, the nibs after being heated remain somewhat moist so that when the beans are subjected to the action of the cracking apparatus for removing the shells and for subdividing the kernels, the undesirable production of nib fines is substantially reduced. In the process of treating cocoa beans in accordance with the present invention, and pursuant to the preferred manner of performing said process, the raw cocoa beans are moistened with water without, however, soaking the beans, and then the moistened beans are conveyed through a heating zone by a current of a hot, gaseous medium. The moistening of the beans without allowing them to absorb an excessive amount of liquid conditions the beans so that when they are heated for roasting or partially roasting them, the shells are more easily removed, the loss of nib particles is reduced, and the nibs or kernels of the beans are of improved quality, while, at the same time, the loss of butter fat from the nibs is greatly reduced. In the continuous process of the present invention, the beans after being moistened and heated, are conveyed to a cracking means which operates to crack the shells of the beans and to subdivide the kernels with a minimum production of nib fines. From the cracking means the cracked beans are conveyed to a separator where the nibs are separated from the shells. After the nibs are separated from the shells, they are conveyed to a heater for further roasting and/or drying the nibs. After the nibs are thus heated, they are removed from the heater for grinding or other treatment.

The above and other objects, features and advantages of the present invention are accomplished in a manner which will now be described with reference to the accompanying illustrative drawings.

In the drawings:

Fig. 1 is a view illustrating more or less diagrammatically the process of the present invention and showing also apparatus utilized in carrying out the process;

Fig. 2 is a transverse sectional view of the moistening drum;

Fig. 3 is a transverse sectional view of the main heating drum;

Fig. 4 is a longitudinal sectional view, partly in elevation, of part of the additional heating means;

Fig. 5 is a vertical sectional view of the air-inlet chamber of the nib and shell separator;

Fig. 6 is a sectional view on the line 6—6 of Fig. 5;

Fig. 7 is a sectional view on the line 7—7 of Fig. 6;

Fig. 8 is a view in elevation of the cracking apparatus, a part being shown in section;

Fig. 9 is a view, partly in elevation and partly in section, of the cracking apparatus;

Fig. 10 is a top plan view of the rotary disk of the cracking apparatus;

Fig. 11 is a view, in elevation, of the stationary head of the cracking apparatus;

Fig. 12 is a bottom view of the stationary head of the cracking apparatus;

Fig. 13 is a detail sectional view on the line 13—13 of Fig. 10;

Fig. 14 is a view showing part of the apparatus and illustrating more or less diagrammatically the means for controlling the flow of the hot gases and of the beans through the main heating drum;

Fig. 15 is a sectional view on the line 15—15 of Fig. 14;

Fig. 16 is a side view, in elevation, of part of the apparatus illustrated in Fig. 14;

Fig. 17 is a sectional view on the line 17—17 of Fig. 15.

Moistening of the beans

In accordance with the preferred manner of moistening the cocoa beans, there is utilized a downwardly inclined rotary drum 10 comprising a cylinder 12 rotatable at the inlet and outlet ends thereof in the stationary heads 14 and 16, respectively. The beans are supplied to the upper end of rotary cylinder 12. Said cylinder 12 is supported on suitably positioned rollers 18 and is continuously rotated about its longitudinal axis in any suitable way. The beans are supplied to the upper end of drum 10 through a conduit 20 leading from an elevated supply hopper 22. The water for moistening the beans is introduced into drum 10 at the upper end thereof through a water spray nozzle 24. Heating of the water is unnecessary and in accordance with the present invention is preferably not heated, but it is within the scope of this invention to utilize heated water or steam may be used if desired. The water spray nozzle 24 is mounted in the head 14 and is supplied with water from a pipe 26 leading from a variable pressure-head device 28 to which the water is pumped by a pump 30 from a water tank 32. The return pipe 34 from the pressure-head device 28 is connected to said water tank. Said pressure-head comprises a plurality of transverse pipes 36 provided with valves 37 whereby the pressure of the water supplied to nozzle 24 can be regulated by closing all but one of the valves in said pipes 36. The uppermost transverse pipe 38 is open at all times so that the water pressure cannot exceed a predetermined amount. While this water pressure device is preferred, it will be understood that any other suitable means may be provided for regulating the pressure of the water supplied to nozzle 24. The supply pipe 26 is provided with a valve 39 for regulating the supply of water to nozzle 24.

As illustrated in Fig. 2, the rotary cylinder 12 is provided with a plurality of longitudinal ribs 40 which are spaced from each other circumferentially of the cylinder and extend preferably for the full length thereof. It will be understood that the cocoa beans are supplied continuously to cylinder 12 and are moistened in said cylinder by the water supplied thereto through nozzle 24. As the beans pass into the cylinder 12, they move by gravity downwardly in said cylinder 12 toward the outlet head 16 thereof, and as said cylinder is constantly rotating, the beans are tumbled therein, the tumbling action being enhanced by the ribs 40, whereby said beans are uniformly moistened during the movement thereof from the inlet head 14 to the outlet head 16.

By moistening the beans in this manner, the adjustment of the quantity of moisture applied to the beans is facilitated and easily controlled. While the quantity of water added to the raw beans may vary, it is desirable to add only such quantity of water as is necessary to obtain the desired results in respect to facilitating the removal of the shells and preserving or improving the flavor and color qualities of the beans. For example, the quantity of water added to the beans may vary from about 0.5% to about 10% by weight of the beans. It is not desirable to add more than about 10% of water because water in excess of this proportion appears to bring about an undesirable change in the flavor and other characteristics of the beans. The preferred quantity of water is about three per cent by weight of the beans, as this quantity yields the desired results and keeps down the amount of heat necessary for evaporating the moisture from the beans during the heating or roasting thereof in the subsequent stages of the process.

The treatment of the beans with water results in the softening of the mucilaginous layer between the kernel and the shell of the bean, thus facilitating the expansion of the shell from the kernel, due to the pressure of the steam between the nib or kernel and the shell when the moistened bean is heated. Some of the steam generated in the space between the kernel or nib and the shell penetrates the nib and thereby results in a steam-cooking of the nib while preventing the same from becoming scorched or overheated.

Heretofore, it has been proposed to add water to cocoa beans prior to the roasting thereof by soaking the beans in water with the result that the beans take up large quantities of water so that considerable heat is required to evaporate the moisture from the beans. Moreover, when the beans are allowed to soak up large quantities of water, the flavor and other characteristics of the beans are changed or impaired, but even when impairment does not occur, the soaking of the beans is undesirable because, as stated, the excessive amount of water or other liquid in which the beans are soaked must be evaporated, thereby resulting in a waste of heat. On the other hand, in accordance with the moistening process of the present invention, it is unnecessary to soak the beans and the application of the moisture to the beans can be easily accomplished while the beans are in transit to the heating or roasting zone, and at the same time the beans are properly conditioned for obtaining the desired results with respect to facilitating removal of the shells and the improvement of the quality of the roasted beans.

It will be understood that while the above described apparatus for moistening the beans is preferred, the beans may be moistened in any other suitable way.

Roasting or partial roasting of the moistened beans

The moistened beans pass continuously from the moistening drum 10 through the delivery pipe 44 to the main heating drum 42 where they are subjected to the action of intense heat. Said drum comprises a cylinder 46 which is rotatable at its opposite ends in the stationary inlet and outlet heads 47 and 48, respectively. Cylinder 46 is mounted for rotation about its longitudinal axis on rollers 49 (Figs. 1 and 3) and is rotated in any suitable way. As the beans enter the inlet head 47 at the end of rotary cylinder 46, they are carried through said cylinder by a current of a hot gaseous medium, specifically gaseous combustion products which are derived from the furnace F and are supplied to cylinder 46 through a pipe 50. The inner wall of cylinder 46 is provided with a plurality of circumferentially spaced curved blades 52 which are fixed to the inner surface of cylinder 46 and extend longitudinally thereof for the full length of said cylinder. Thus, as the beans are moved longitudinally of the drum toward the outlet head 48 thereof by the current of hot gases, they are also carried around by the drum, which is continuously rotating, and are cascaded from the upper part of the cylinder toward the center and lower part thereof while being moved longitudinally of the cylinder. The hot gases from the furnace F are drawn from said furnace, through the supply pipe 50, and through the heating cylinder 46 by a motor driven suction fan 54 which is connected to the outlet end of a chamber 56 to which the outlet head 48 of the heating drum 42 is connected. Said fan delivers to an exhaust pipe or stack 57. The flow of the hot gases through drum 42 is controlled automatically by a control apparatus which will be subsequently described. It will be understood that the beans are conveyed through the heating drum 42 solely by the current of hot gases which thus constitute means for conveying the beans through the heating drum in addition to means for heating the beans while in transit through said drum. Accordingly, the time of heating of the beans in said drum can be controlled by regulating the flow of said hot gases which in turn regulates the flow of beans through said drum.

Furthermore, as the beans are conveyed through the drum by the current of gases, beans which require more heating than others in order to puff their shells remain in the drum longer than the beans which require less heating. For example, shrivelled beans are less easily puffed and therefore require more heating than beans of better quality. The better beans, those which are easily puffed, have a lower specific gravity than the poorer or shrivelled beans, and therefore are conveyed more rapidly through the heating drum than are the poorer beans.

The temperature and quantity of hot gases supplied to the heating drum 42 are adjusted in relation to the quantity of beans heated in the drum per unit of time whereby the beans which are in moistened condition and at ordinary or room temperature when introduced into the heating drum are heated to a temperature of about 275° F. when the beans are at the outlet head 48 of the drum. For example, the temperature of the hot gases at the inlet head 47 of the roasting drum is about 1300° F. and the temperature of said gases at the outlet head 48 of the drum is about 500° F., eight thousand cubic feet of gases per minute passing through the drum, and the latter having a diameter of two feet, and conveying through the drum while heating the same about sixteen thousand pounds of beans per hour. It will be understood that this quantitive data is set forth only for the purpose of more fully explaining the process and is not to be considered in a limiting sense, particularly since the rate of production may be varied without departing from the present invention and since the degree of heating of the beans in the drum 42 may be varied depending upon the particular cocoa beans being treated and/or the quantity of moisture added to the beans before they are introduced into the heating drum. The use of gaseous products of combustion as the medium for heating the beans in drum 42 is preferred to heated air because the beans are less likely to catch on fire in said drum in the event that the flow of beans through said drum is interrupted for any reason.

The beans heated in the drum 42 are conveyed to the chamber 56 through the outlet head 48 connected thereto and are continuously removed through the lower outlet 57 of said chamber through the rotary air seal 58 which prevents the passage of air or gases into said chamber through said outlet while permitting the beans to pass therethrough. The beans may be removed through the outlet pipe 60 which may be connected to a bin (not shown) in which the roasting of the beans may be completed by the heat stored in the beans during the passage thereof through the roasting drum, or when the beans are roasted to the desired degree in the roasting drum, they may be collected and subjected to any of the usual processes for removing the shells of the beans and otherwise treating the same without further roasting. However, in lieu of delivering the beans through the outlet pipe 60, said beans are preferably alternatively delivered to a pipe 62 which is connected to the outlet 57 of chamber 56. Pipes 60 and 62 are provided with slide valves or cut-offs 64 and 66, respectively, to control the flow of the beans either through pipe 60 or pipe 62. When valve 64 is closed and valve 66 is opened, the beans flow into pipe 62 which connects to the inlet 68 of a conveyor 70. Said conveyor may be of any suitable type and, as here shown, is of the type known as a "Redler" conveyor which is a conveyor of the type illustrated in United States Patent No. 1,991,887. Said conveyor operates to carry the beans from a lower floor of the plant to an upper floor thereof at which the apparatus indicated generally at 72 for cracking the beans preliminary to the separation of the nibs from the shells is located.

The beans pass from the top horizontal part 74 of the conveyor 70 to the cracking apparatus 72 through the vertical pipe 76 and the inlet pipe 78 which is provided with a rotary screw conveyor 80. The construction and operation of the cracker will be hereinafter more specifically described, but it is to be noted at this point that in the cracker the puffed shells of the beans are broken and the kernels are subdivided. The beans leave the cracking apparatus through the outlet 82 from which they are directed onto the jogging screen or sieve 84. The particles of shells and beans which pass through the sieve pass into the pipe 86 which leads to the inlet 88 of the "Redler" conveyor 90, while the nibs and shell particles which are too large to pass through the sieve 84 pass through the pipe 92 onto a conveyor belt 94 by which they are directed to a separator 96 which operates as hereinafter more particularly described to separate shells and the smaller nib particles from the uncracked beans or larger nib particles. The uncracked beans and larger nib particles pass through the outlet 98 of the separator 96 through the tube 100 provided with a rotary screw conveyor 102 into an auxiliary cracker 104 of known construction. In said cracker 104, the beans which have not been sufficiently cracked in the main cracking apparatus 72 are broken and then pass through the tube 106 into the inlet 68 of the conveyor 70 by which they are returned to the main cracking apparatus 72. The smaller nib particles which pass into the separator 96 and are therein separated from the uncracked beans and the larger nibs leave said separator through the outlet pipe 108, while the shells which pass into the separator 96 leave the latter through the outlet pipe 110. The overflow of beans from the upper part 74 of the conveyor 70 which do not pass into the cracking apparatus 72 are returned to the inlet 68 of said conveyor through the pipe 112 or, alternatively, may pass through the outlet pipe 114 for collection in a receptacle (not shown). For this purpose, a pivoted cut-off 116 is provided and can be swung to either of two positions, for closing either the inlet end of pipe 112 or the inlet end of pipe 114. The nibs and shells which pass through the sieve 84 into the inlet 88 of the conveyor 90 are conveyed by the latter to the air-operated separator 118 from the upper part 120 of conveyor 90 through the conveyor tube 122 provided with a rotary screw conveyor 124 by which the beans are supplied to a spreading device 126, the construction and operation of which will be subsequently described. Said last mentioned device includes a hopper 128 which connects to said separator 118.

The nibs pass from the separator 118 through the outlet pipe 130 to the conveyor tube 132 provided with a rotary screw conveyor 134 and are conveyed by the latter to the heater 136. In said heater the nibs are additionally heated to complete the roasting thereof and/or to remove most of the moisture remaining in the nibs following the first heating thereof in the main heating drum 42 as described above. The heater 136 comprises the rotary cylinders 136 and 140. Rotary cylinder 138 is mounted for rotation about its longitudinal axis in the stationary inlet head 142 and in the stationary connecting head 144. The rotary cylinder 140 is mounted for rotation about its longitudinal axis in said connecting head 144 and in a stationary outlet head 146. The rotary cylinders 136 and 140 are provided with fixed helical conveyor members 148 and 150 which operate to move the nibs longitudinally of the respective cylinders during the rotation of the latter. Preferably, the pitch of the helical conveyor members 148 and 150 is smaller near the outlet end of each of said cylinders than near the inlet end thereof. This is illustrated in Fig. 4 with reference to the rotary cylinder 136 which shows a longitudinally extending part 152 of the helical member 148 of larger pitch and a longitudinally extending part 154 of the conveyor member 148 of smaller pitch, the last mentioned part being near the connecting head 144. It will be understood that the helical member 150 in the rotary cylinder 140 is of the same construction except that the longitudinally extending part of smaller pitch is near the outlet head 146 of said cylinder. The nibs are heated in the heater 136 by hot gases, preferably gaseous combustion products derived from the furnace F and supplied to said heater through the conduit 156 which connects to the stationary inlet head 142 of cylinder 138. These gases pass through the cylinder 136 in contact with the beans therein and then to cylinder 140 through the connecting head 144 and through said cylinder to the outlet pipe 158 which connects to the stationary outlet head 146 of said cylinder. The hot gases are drawn from the furnace F and through the cylinders 138 and 140 by a motor-operated suction fan 160 which delivers the gases to the exhaust stack 57 to which the above mentioned exhaust fan 54 delivers as described above. The temperature of the gases supplied to heater 136 is about 400° F., but of course can be higher or lower than this temperature. As illustrated, the beans which leave the conveyor 132 through the outlet pipe 162 are conveyed into the rotary cylinder 136 by an auxiliary conveyor tube 164 provided with a hopper 166 which is connected to said outlet pipe 162, said conveyor tube being provided with a rotary screw conveyor 168. The beans are guided from the outlet end of cylinder 138 into the inlet end of cylinder 140 by a stationary guide member 170 positioned in the connecting head 144, and the beans leave the cylinder 140 through an outlet pipe 172 which is connected at its inlet end to the stationary outlet head 146. From the outlet 172, the roasted nibs pass to the grinding apparatus 173 illustrated more or less diagrammatically in Fig. 1.

Cracking of the beans

As described above the beans are cracked after they are heated in the heating drum 42 and before they are additionally heated in heater 136, and for this purpose they are passed through the cracking apparatus 72 which will now be more particularly described with special reference to Fig. 1 and to Figs. 8 to 13. Said cracking apparatus comprises a stationary casing 174 formed of the frustro-conical sections 176 and 178 connected to each other at their wider ends and provided, respectively, with an inlet tube 180 and with said outlet pipe 82, said inlet tube being connected to the outlet end of the conveyor tube 78 which conveys the beans into the cracker from the upper part 74 of the conveyor 70. A rotary shaft 182 is disposed within tube 180, being supported and journalled for rotation in bearings 184 and 186 fixed in said tube. A disk 188 is carried by the lower end of shaft 182 to which it is fixed for rotation therewith in casing 174. A stationary head 190 is fixed to tube 180 and extends completely therearound in confronting relation to disk 188. The upper surface of rotary disk 188 is provided with a plurality of circumferentially spaced radial ribs 192 and 194 at the peripheral marginal edge of said disk. The stationary head 190 is provided at its lower end with ribs 196 and 198 which are positioned over and adjacent to the ribs on disk 188, there being sufficient clearance between the ribs of said disk and head to allow rotation of said disk in relation to said head.

An air-blower 200 has its outlet connected to tube 180 by a pipe 202 and is connected at its inlet to the upper casing part 176 by a tube 204. Said blower delivers a current of air under pressure to the inlet tube 180 of the cracking apparatus and acts in conjunction with the rotary disk 188 to move the beans through the spaces between the ribs on said disk and on head 190. More particularly, the beans supplied to the cracker through the inlet tube 180 are blown downwardly against disk 188 and are moved by said air pressure and by centrifugal force against the ribs on the disk 188 and the head 190 whereby the puffed shells on said beans are cracked and broken and kernels of the beans are subdivided. The vertical depth of the grooves defined by the ribs on the disk and head is somewhat larger than the thickness of the bean, and in passing through the grooves to the outlet side of the passage defined by the confronting surfaces of disk 188 and head 190, the beans in addition to being thrust against the ribs by centrifugal force and by air pressure are subjected to cracking action by the ribs, due to the relative rotary movement of said disk and head and are thereby cracked and broken. As here shown, the head 190 is provided with a plurality of stationary vanes 206 which reduces turbulence of the air flow from the outlet side of the passage between the disk and head to the inlet of blower 200. The blower 200 besides operating to deliver air under pressure into the inlet tube 180, also serves to withdraw dust formed in casing 174 during the cracking of the beans, this dust being withdrawn from said casing through tube 204 which connects to the inlet of said blower. Said tube 204 is provided with an upwardly extending part 208 disposed within and spaced from the inner surface of a dust-collecting tube 210 in which the dust collects and from which it can be removed, said tube 210 being provided with a normally closed cut-off 212 as illustrated in Fig. 1. The cracking apparatus is not claimed herein, but is claimed in the application of Wallace T. Jones filed concurrently herewith, as said cracking apparatus is the sole invention of Wallace T. Jones.

*Control of flow of beans through main heating drum*

As explained above, the moist beans which pass into the main heating drum 42 from the moistening drum 10 are conveyed through said heating drum by a current of hot gases and that the flow of the beans through said drum can therefore be regulated by regulating the flow of said hot gases through the heating drum. The means for regulating the flow of the gases through drum 42 comprises a valve 214 located between the outlet end of the drum 42 and the inlet of the suction fan 54 (Figs. 1, and 14 to 17). More particularly, as here shown, said valve 214 is positioned at the upper end of chamber 56 to which the inlet of said suction fan is connected. As the flow of the hot gases through drum 42 is controlled by regulating said valve, the suction fan preferably operates at constant speed. Said valve 214 comprises a stationary plate 216 and a movable plate 218. Said plates are provided with a plurality of openings 220 and 222, respectively, which register with each other in the open condition of the valve and which are out of registry with each other in the closed condition of the valve. Valve plate 218 is seated upon plate 216 and is slidable on the latter between the fully-open and fully-closed positions of the valve whereby the size of the passage through the valve can be regulated.

Preferably, in accordance with the present invention, valve plate 218 is adjusted to maintain a predetermined flow of hot gases, and therefore of the beans, through the heating drum 42, in such manner as to maintain said flow of gases and beans at uniform rates, respectively. The means for adjusting valve 214 comprises a reversible motor 224 which is operatively connected to valve plate 218 for moving the same in relation to plate 216. The shaft 226 of said motor is connected to a rotary shaft 228 by a sprocket chain 230 which is driven by the sprocket wheel 232 fixed to the motor shaft and which drives the sprocket wheel 234 fixed to said shaft 228. Rods 236 are fixed to valve plate 218 by means of companion lugs 238 and are slidable in companion bearings 240 provided in the valve casing 242. Each of said rods is provided with a screw threaded part 244 which is engaged by a companion nut 246 which is free to rotate with respect to the companion rod which is held against longitudinal movement by a companion member 248. It will be understood that when nuts 246 are rotated, the companion rods 236 are moved longitudinally and thereby move valve plate 218 on plate 216 for regulating the size of the passage through the valve. Each nut 246 is provided with a sprocket wheel 250. The sprocket wheels 250 of pairs of nuts are connected as illustrated in Fig. 15 by sprocket chains 252. Two of the nuts 246 are rotated by shaft 228 and for that purpose are operatively connected to said shaft by the sprocket chains 254 connected to sprocket wheels 256 fixed to said shaft and to sprocket wheels 258 fixed to said two nuts 246. It will be understood that when motor 224 is rotated in one direction, valve plate 218 is moved in a direction for closing or partially closing the passage through the valve and that when said motor is reversed, valve plate 218 is moved in the opposite direction for opening or partially opening the passage through said valve. Accordingly, by controlling the operation of motor 224, valve 214 is regulated.

Preferably, in accordance with the present invention, the operation of motor 224 for regulating valve 214 is accomplished automatically under the control of the pressure of the gaseous medium at the inlet end of the heating drum 42. The means provided for this purpose comprises as here shown the mercury switches 260 and 262 connected, as illustrated in Fig. 14, to the relays 264 and 266, respectively, for operating the reversing switch 268 of motor 224. Said switches 260 and 262 are mounted for tilting movement on a lever 270 pivoted between the ends thereof on a fulcrum 272. In the normal horizontal position of lever 270, corresponding to the desired flow of gases through the heating drum 42, both switches are open. Said lever is pivoted in one direction or the other for closing either switch 260 or switch 262 under the control of the pressure-responsive devices 274 and 276 which are in turn controlled by the pressure-responsive device 278. Each of said devices is of substantially the same construction and comprises a liquid receptacle 280 containing a liquid for forming a liquid seal at the lower end of the inverted open bottom chamber-forming member 282. Member 282 is closed at its top and a predetermined quantity of air is contained therein above said liquid. Members 282 of pressure-responsive devices 274 and 276 are pivotally connected to the opposite ends of lever 270 by rods 284. The air chambers in members 282 of pressure-responsive devices 274 and 276 above the liquid therein are connected by means of tubes 286 and 288, respectively, to tubes 290 and 292, respectively, which are open at their ends. Said tubes 290 and 292 are connected to tubes 294 and 296, respectively which communicate with valve casing 242 at the outlet side of valve 214. The air chamber of pressure-responsive device 278 is connected by means of a tube 300 to the stationary head 47 at the inlet end of the heating drum 42. Member 282 of said last mentioned pressure-responsive device is connected to a lever 302 which operates a valve 304 for opening and closing the ends of tubes 290 and 292. Said lever is mounted on the fulcrum 306 and is provided with a counterweight 308.

When the gas pressure at the inlet end of the heating drum is normal, valve 304 is in its neutral position out of engagement with the ends of tubes 290 and 292, and likewise the switches 260 and 262 are open. Assuming that the pressure at the inlet end of the rotary drum is below normal thereby indicating an abnormally high rate flow of gases through said drum, the pressure in the chamber of pressure-responsive device 278 is decreased, thus allowing member 282 of said device to move downwardly in the companion receptacle 280 thereof, thereby resulting in the closing of tube 290 by valve 304. When valve 304 is thus closed, the suction fan 54 operates to reduce the pressure in the chamber of pressure-responsive device 274 so that member 282 of said device is lowered, thus closing switch 260 which, through relay 264, operates the switch 268 of motor 224 whereby the latter is operated in a direction for moving valve plate 218 toward its valve closing position. As soon as the valve plate 218 has moved sufficiently to restrict the passage through the valve to the extent required for reducing the flow of gases through the heating drum, an increase of pressure takes place at the inlet end of said drum and is communicated to the chamber of pressure-responsive device 278. Upon an increase of pressure in the chamber of pressure-responsive device 278, valve 304 is moved to a position for opening tube 290 and normal pressure is restored in the chamber of pressure-responsive device 274, whereby switch 260 is moved to its open position. On the other hand, if the pressure in the chamber of pressure-responsive device 278 is increased in response to the abnormal increase of pressure at the inlet of drum 42, valve 304 is moved to a position in which it closes the end of tube 292, and thereupon the pressure in the chamber of pressure-responsive device 276 is lowered so that switch 262 is closed, thus reversing the operation of electric motor 224 so that it operates to move valve plate 218 in valve opening direction to increase the size of the passage through valve 214, thus enabling suction fan 54 to reduce the pressure at the inlet side of the drum 42. The automatic control means described above is not claimed herein as it is not per se our invention, but said control means is claimed in the application of Henry A. Zeeh and Raoul A. Vacher, filed concurrently herewith.

*Separation of shells and nibs*

After the shells and nibs are passed through the cracking apparatus 72, they are treated as described above in the separators 96 and 118. In each of these separators, the nibs and shells or parts thereof are subjected to the action of an air current which operates to separate the lighter or finer pieces or particles from the heavier or larger pieces or particles which are conveyed to said separator. The air inlet chamber for separator 96 is indicated at 310 in Figs. 1 and 5. Referring to Figs. 5 to 7, said air inlet is provided with vertical plates 312 and horizontal plates 314 which define a plurality of substantially rectangular passage-ways for the flow of air supplied to said inlet chamber through the air inlet tube 316. Said tube 316 is provided with a plurality of openings 320 through which the air passes into passage-ways 314. The air inlet chamber as thus constructed is preferred as it reduces the turbulence of the air flow and improves the separating action of the air current in the separator. The separator 118 is provided with a similar air inlet chamber indicated at 312' in Fig. 1. It will be understood that the air stream flowing into the separator through the air inlet chamber carries the lighter or smaller particles in the direction of the flow of air to points spaced longitudinally of the air stream from which particles of predetermined size drop by gravity into collecting hoppers or outlets. In the case of separator 96, the material is supplied thereto in the form of a sheet by the conveyor belt 94 to which the material flows from the hopper 322 connected to the pipe 92 which leads from the cracking apparatus 72. In the case of separator 118, the material in hopper 128 which is connected to said separator is distributed in more or less sheet-like form by a roller 324 mounted in said hopper. A plate 326 is adjustable in hopper 128 in relation to roller 324 to regulate the amount of material or thickness of the layer of material which is supplied to said separator from said hopper. In separator 118, the nibs which are deflected by the air stream drop into the outlet tube 130 which connects to the conveyor tube 132 leading to the heater 136. The shells and nib fines are deflected by the air stream and move with the latter to points spaced longitudinally of the air stream where they drop into collecting hoppers or outlet pipes. As here shown, the outlet hoppers 327 and 328 of separator 118 are provided with sieves 330 and 332, respectively, for separating the smaller particles from the larger particles. The particles which pass through sieve 330 are collected through an outlet pipe 334, while the particles which are too large to pass through that sieve are conveyed by a pipe 336 to the inlet 88 of the "Redler" conveyor 90 by which they are returned to the separator where they are again subjected to the separating action of the air stream. Additional hoppers 338, 340 and 342 are provided in separator 118 for the progressively finer or lighter particles of shell, that is such particles which are light enough to be conveyed by the air stream to the points at which said hoppers are located.

Having thus described our invention, what we claim and desire to secure by Letters Patent is:

1. The process of treating cocoa beans which comprises moistening the raw beans, delivering the moistened beans to a current of hot gases in a heating zone and utilizing said current of hot gases to convey the beans through said zone and to simultaneously heat the beans to expand and puff the shells in relation to the shell-enclosed nibs and to at least partially roast the nibs while they are being conveyed through said zone by said current of hot gases.

2. The process of treating cocoa beans which comprises moistening the raw beans, delivering the moistened beans to a current of hot gases in a heating zone and utilizing said current of hot gases to convey the beans through said zone and to simultaneously heat the beans to expand and puff the shells in relation to the shell-enclosed nibs and to at least partially roast the nibs while they are being conveyed through said zone by said current of hot gases, cracking said beans while the kernels are moist and separating the nibs from the shells.

3. The process of treating cocoa beans which comprises continuously moving a mass of raw beans through a plurality of successive zones, applying moisture to said beans while they are moving through one of said zones, and then bringing said beans into a current of a hot gaseous medium in another of said zones for moving the beans therethrough and for heating and thereby at least partially roasting them while in transit through said last mentioned zone.

4. The process of treating cocoa beans which comprises conveying raw cocoa beans through a heating zone by a current of a hot gaseous medium and at least partially roasting the beans by the heat of said medium while the beans are being conveyed thereby, and regulating the flow of said beans through said heating zone by regulating the flow of said hot gaseous medium through said zone.

5. The process of treating cocoa beans which comprises conveying them through a heating zone from the inlet to the outlet thereof by a current of a hot gaseous medium containing hot gaseous products of combustion whereby said beans are at least partially roasted while being conveyed through said zone, and then separating said beans from said current of hot gaseous medium.

6. In a continuous process of treating cocoa beans, continuously passing a current of a hot gaseous medium through a conduit from an inlet to and through an outlet, continuously moving raw cocoa beans through a zone in which the beans are moistened and continuously introducing the moistened beans as they issue from said zone into said conduit at or near said inlet whereby said beans are conveyed through said conduit by said current of the hot gaseous medium to a discharge point spaced from said inlet and are simultaneously heated by said hot gaseous medium so that they are at least partially roasted, and continuously removing beans from said conduit separate from said gaseous medium while the flow of beans and the hot gaseous medium through said conduit continues, and regulating the rate of flow of said hot gaseous medium through said conduit for regulating the rate of flow of the beans through said conduit whereby to control the degree of heating of the beans while they pass through said conduit.

7. The process of treating cocoa beans which comprises moistening the raw beans with a quantity of water sufficient only to wet the shells of the beans without substantial penetration of water into the shell-enclosed nibs of the beans, passing a current of a hot gaseous medium continuously in one direction through a conduit, continuously introducing such moistened beans into said conduit whereby the hot gaseous medium propels said beans through said conduit in the direction of the current flow and simultaneously heats the beans with progressive decrease in the temperature of said gaseous medium due to transfer of heat from said gaseous medium to said beans while the hot gaseous medium and the beans flow through said conduit toward the outlet thereof, the nibs of the beans being at least partially roasted by said heating thereof.

8. The process of treating cocoa beans which comprises moistening the raw beans with a quantity of water sufficient only to wet the shells of the beans without substantial penetration of water into the shell-enclosed nibs of the beans, passing a current of a hot gaseous medium continuously in one direction through a conduit, continuously introducing such moistened beans into said conduit whereby the hot gaseous medium propels said beans through said conduit in the direction of the current flow and simultaneously heats the beans with progressive decrease in the temperature of said gaseous medium due to transfer of heat from said gaseous medium to said beans while the hot gaseous medium and the beans flow through said conduit toward the outlet thereof, the nibs of the beans being at least partially roasted by said heating thereof, and regulating the rate of flow of said hot gaseous medium through said conduit for regulating the rate of flow of the beans through said conduit whereby to control the degree of heating of the beans while they pass through said conduit.

9. The process of treating cocoa beans which comprises moistening the raw beans with a quantity of water sufficient only to wet the shells of the beans without substantial penetration of water into the shell-enclosed ribs of the beans, and bringing the moistened beans into a current of a hot gaseous medium flowing through a conduit and heating and propelling said beans through said conduit by said hot gaseous medium with progressive decrease in the temperature of said gaseous medium due to transfer of heat from said gaseous medium to said beans while the hot gaseous medium and the beans flow through said conduit toward the outlet thereof, the nibs of the beans being at least partially roasted by said heating thereof, and separating the heated beans from said current of hot gaseous medium while the flow of beans and hot gaseous medium through said conduit continues.

WALLACE T. JONES.
BENJAMIN J. ZENLEA.

REFERENCES CITED

The following references are of record in the file of this patent:

UNITED STATES PATENTS

| Number | Name | Date |
|---|---|---|
| 1,991,190 | Backer et al. | Feb. 12, 1935 |
| 2,212,120 | Kneale et al. | Aug. 20, 1940 |
| 1,750,795 | Defren | Mar. 18, 1930 |
| 2,064,524 | Diefenbach | Dec. 15, 1936 |
| 2,278,483 | Plews | Apr. 7, 1942 |
| 2,060,581 | Laessig | Nov. 10, 1936 |
| 2,278,471 | Musher | Apr. 7, 1942 |
| 2,288,045 | Stephens | June 30, 1942 |